US008688889B2

(12) United States Patent
Bauchot et al.

(10) Patent No.: US 8,688,889 B2
(45) Date of Patent: Apr. 1, 2014

(54) VIRTUAL USB KEY FOR BLADE SERVER

(75) Inventors: Frederic Bauchot, Saint-Jeannet (FR); Gerard Marmigère, Drap (FR); Patrick Michel, La Gaude (FR); Joaquin Picon, Velaux (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/599,072

(22) Filed: Aug. 30, 2012

(65) Prior Publication Data

US 2012/0324188 A1 Dec. 20, 2012

Related U.S. Application Data

(63) Continuation of application No. 12/821,981, filed on Jun. 23, 2010.

(30) Foreign Application Priority Data

Jun. 26, 2009 (EP) .................................... 09305606

(51) Int. Cl.
*G06F 13/00* (2006.01)
(52) U.S. Cl.
USPC .............................. 710/316; 710/51; 710/305
(58) Field of Classification Search
USPC .............. 710/8–10, 20, 21, 51, 74, 300, 305, 710/313, 316, 317
See application file for complete search history.

(56) References Cited

U.S. PATENT DOCUMENTS

| 7,400,648 | B2 * | 7/2008 | Cromer et al. ................ 370/466 |
| 7,412,544 | B2 | 8/2008 | Gibson et al. |
| 7,688,851 | B2 * | 3/2010 | Cromer et al. ................ 370/466 |
| 8,019,912 | B2 * | 9/2011 | Coletrane et al. .............. 710/31 |
| 2003/0191908 | A1 * | 10/2003 | Cohn et al. ..................... 711/153 |
| 2005/0021654 | A1 * | 1/2005 | Kern et al. ..................... 709/211 |
| 2005/0283549 | A1 * | 12/2005 | Gibson et al. .................. 710/62 |
| 2006/0095595 | A1 * | 5/2006 | Dalton et al. ..................... 710/5 |
| 2006/0095644 | A1 * | 5/2006 | Fujita et al. .................. 710/313 |
| 2006/0104289 | A1 * | 5/2006 | Lee ............................. 370/400 |
| 2007/0101029 | A1 * | 5/2007 | Lee ............................... 710/72 |
| 2007/0245058 | A1 * | 10/2007 | Wurzburg et al. ............ 710/313 |
| 2008/0215844 | A1 | 9/2008 | Thomas |
| 2009/0006702 | A1 * | 1/2009 | Sarangdhar et al. .......... 710/305 |
| 2009/0204965 | A1 * | 8/2009 | Tanaka et al. ..................... 718/1 |

\* cited by examiner

*Primary Examiner* — Khanh Dang
(74) *Attorney, Agent, or Firm* — Jeffrey T. Holman

(57) ABSTRACT

A method for sharing data contained on a peripheral device amongst a plurality of blade servers is disclosed. The method includes storing a copy of data from a peripheral device to a memory device. The memory device is partitioned into at least 'n' memory areas, each memory area storing one copy of the data. The method also includes assigning one of the at least 'n' memory areas to each of a plurality 'n' of servers. The method also includes establishing communication between the plurality of servers and the plurality of assigned memory areas via a switch controller. The switch controller is configured to access the plurality of assigned memory areas via a processor.

20 Claims, 3 Drawing Sheets

VIRTUAL USB KEY FOR BLADE SERVER

CROSS-REFERENCE TO RELATED APPLICATIONS

This application is a continuation of U.S. application Ser. No. 12/821,981, filed on Jun. 23, 2010, which claims the benefit of priority of European Patent Application No. EP09305606 entitled "Virtual USB Key for Blade Server," which was filed on Jun. 26, 2009. Each of the referenced applications is hereby incorporated by reference in its entirety.

TECHNICAL FIELD

The present invention relates generally to blade centers and more particularly to a method for providing to blade servers a virtual access to universal serial bus (USB) key.

BACKGROUND

Bladecenter is a widely used architecture in datacenters. Bladecenter allows housing multiple blade servers in a single chassis. It is used to save space and improve system management.

Blade servers are thin servers that insert into a single rack-mounted chassis which supplies shared power, cooling, and networking infrastructure.

Each server is an independent server having its own processors, memory, storage, network controllers, operating system, and applications.

Blade servers allow more processing power in less rack space, simplifying cabling and reducing power consumption.

The advantage of blade servers comes not only from the consolidation benefits of housing several servers in a single chassis, but also from the consolidation of associated resources (like storage and networking equipment) into a smaller architecture that can be managed through a single interface.

Each blade server typically comes with several local drives. For additional storage, blade servers can connect to a storage pool facilitated by a network-attached storage, Fiber Channel, or iSCSI storage-area network.

A blade center has generally at least one USB port which is assigned to a specific blade server when the data of the USB device is to be accessed. The USB assignment is generally done by an administrator from an external computing console, which is connected to the blade servers via a management module which contains logic to allow USB data to be accessed by the assigned blade server.

A typical blade center is illustrated in FIG. 1. A blade server chassis 102 coupled to a management module 104 includes a plurality of blade servers 102-0 to 102-n. The management module 104 offers at least one USB port 106 to allow connection of a USB device 108, and a serial port 110 to connect an administration computing console 112. The serial port may be a common COM port compliant with the well-known RS-232 standard. The USB devices 108 may be any type of USB compliant device that uses flash memory storage. The logic to allow the operation of blade servers, specifically the allocation of data from the USB device, is made of a micro-controller 114 which transmits the selection from the administrative console 112 to a multiplexer 116 that receives the USB data and transmits it to the assigned blade server.

This conventional USB assignment operation is heavy, tedious and may involve errors as any new settings need to run an initial program load (IPL) of the overall system.

Moreover, the existing system allows only one blade server to use data stored on the USB key at a time, which is a great limitation in contemporary systems because information delivered on USB keys is only shared sequentially between several blade servers. Without any limitation, an example is the famous license terms and conditions that must be approved before using software applications and which is a typical use of sharing the same data amongst a plurality of blade servers.

Finally, another drawback of such conventional arrangements is that the access to the USB key is time consuming.

SUMMARY

Embodiments described herein address some or all of the aforementioned problems. Accordingly, some embodiments provide a method for allowing a plurality of servers to access simultaneously data stored on a USB device.

Some embodiments provide a method that improves performance of a blade center by greatly reducing the time to access data stored on a USB device.

Some embodiments allow time saving for blade servers configuration by affording use of an external administration console.

Further embodiments of a method are described in the appended independent claims.

In one embodiment, a method for sharing data contained on a peripheral device amongst a plurality of servers is described. The method includes storing a copy of data from a peripheral device to a memory device. The memory device is partitioned into memory areas. Each memory area stores one copy of the data. The method also includes assigning one of the memory areas to each server. The method also includes establishing communication between the plurality of servers and the plurality of assigned memory areas via a switch controller. The switch controller is configured to access the assigned memory areas via a processor.

In one embodiment, the method allows simultaneous access of a plurality of blade servers to data copied from a peripheral USB key.

Further embodiments are described in the appended dependent claims.

Further aspects of embodiments of the invention will now be described, by way of examples, with reference to the accompanying figures.

BRIEF DESCRIPTION

The above and other items, features, and advantages of embodiments of the invention will be better understood by reading the following more particular description of the embodiment of the invention in conjunction with the accompanying drawings.

DETAILED DESCRIPTION

Embodiments of the invention are described herein after by way of examples with reference to the accompanying figures and drawings.

Figure 1:
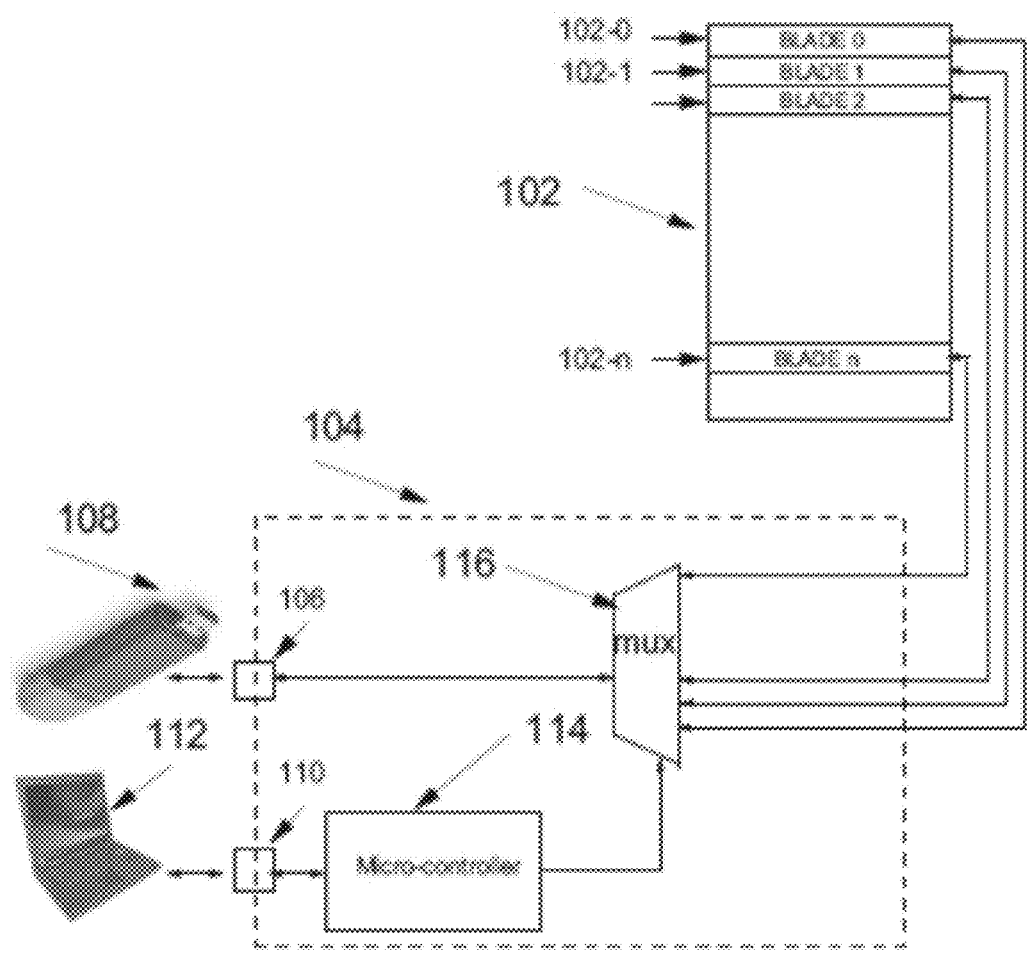
FIG. 1 depicts a conventional block diagram of a server blade management module.
Figure 2:
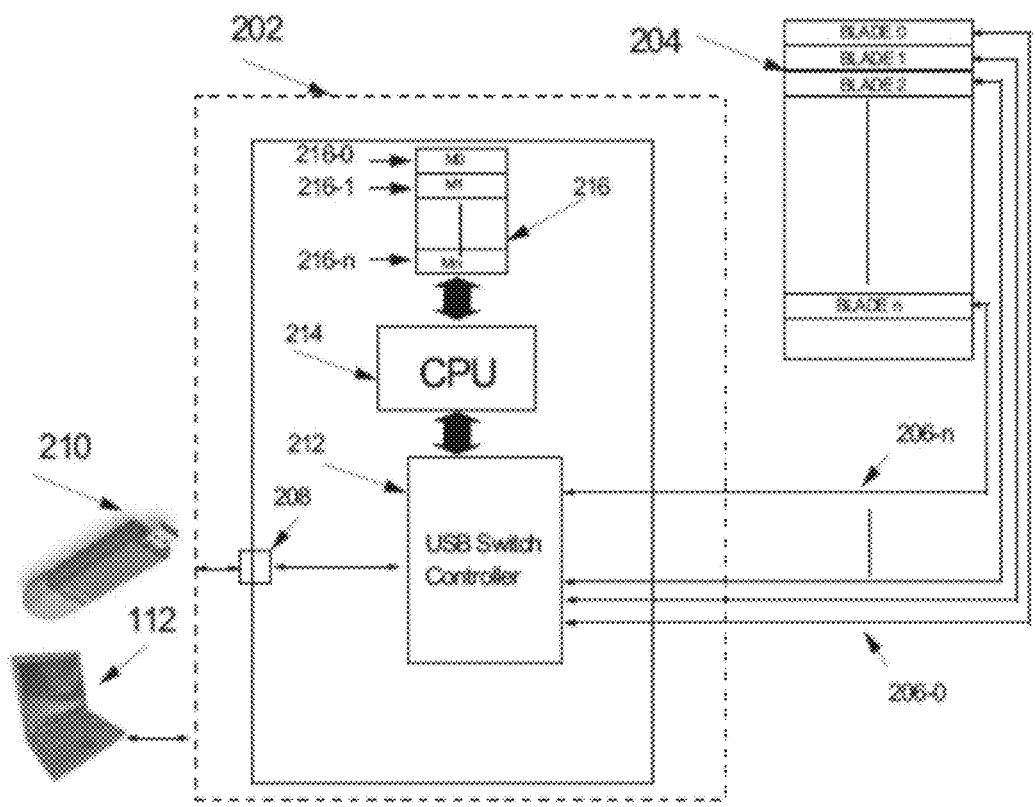
FIG. 2 depicts a block diagram of a server blade management module in one embodiment of the present invention.

With reference to FIG. 2, there is depicted a schematic block diagram of a management module 202 used in one embodiment. Also shown is a blade server chassis 204 made of a plurality of blade servers 204-0 to 204-n. Blade server chassis is capable of connecting one or several blade servers to the management module 202. Note that while management module 202 is depicted as a single management module, in another embodiment, server blade chassis may have two management modules (not shown), the first functioning as a primary management module and the second acting as a backup management module to the first management module.

Management module 202 is coupled to each blade server 204 via USB bus lines 206-0 to 206-n.

Management module 202 includes a USB port 208 to allow connection of a USB device 210, in compliance with the Universal Serial Bus Specification, as standardized by the USB-IF organization.

A USB switch controller 212 is coupled to the USB port 208, to the USB bus lines 206-0 to 206-n, and to a central processing unit module (CPU) 214. The switch controller contains logic to manage the switching operation and to allow a blade server to access its assigned memory area when in operation. In one embodiment, the USB bus 206 is compliant to the USB 2.0 standard.

The CPU module 214 is coupled to a memory device 216 that is partitioned into 'n' memory areas 216-0 to 216-n. Each memory area allows storing a copy of data copied from the USB device 210. The memory device may be any kind of random access memory (RAM).

In operation, each blade server 204-0 to 204-0 is allowed to access only one memory area 216-0 to 216-n that has been assigned during the configuration phase.

Figure 3:
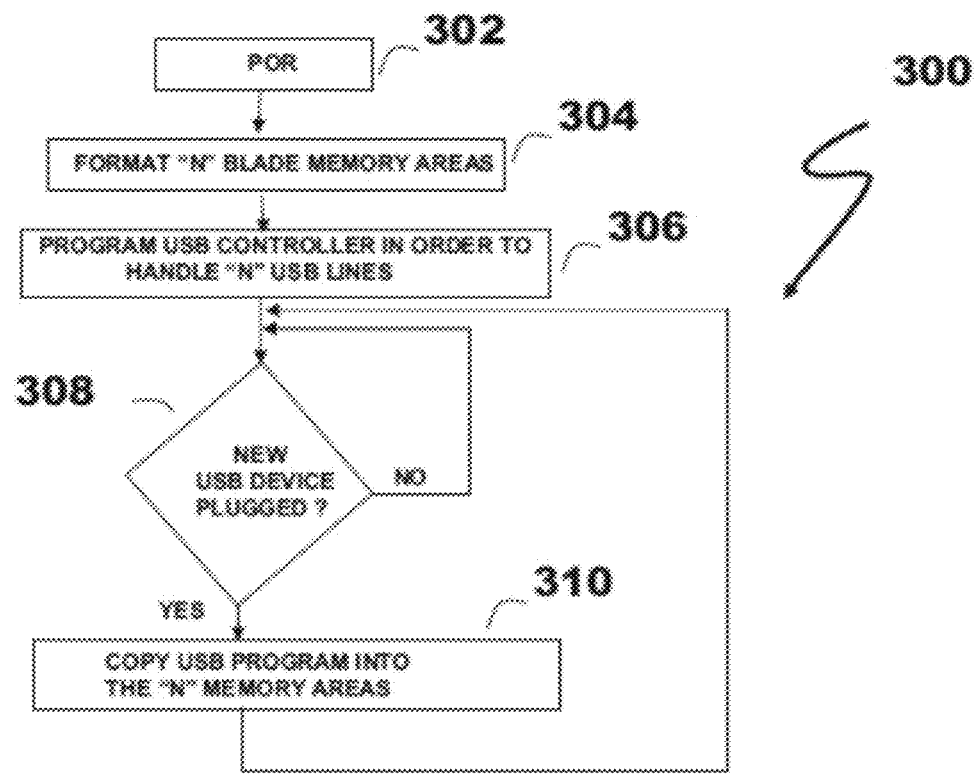
FIG. 3 shows a flow chart of the process to create a virtual USB key in one embodiment of the present invention.

FIG. 3 shows a flow chart showing the operations of the virtual USB key in one embodiment.

After the power on reset (POR) operation 302, the memory is formatted 304 and partitioned to allocate n separate memory areas 216-0 to 216-n to the respective n blade servers 204-0 to 204-n inserted into the blade center.

The CPU initializes 306 the USB switch controller to allow each blade server to be able to access its assigned memory area via its respective USB bus 206-0 to 206-n.

The CPU waits 308 for the detection of a plug-in of a USB device.

When a detection occurs (branch yes), the content of the USB device is copied 310 into each memory area of the cache memory. Thereafter, the USB device may be removed from the USB port.

When one or several blade servers access the USB device, the access may be performed simultaneously in real time with no latency, directly on the one or several respective memory areas.

Embodiments described herein afford several improvements and novel functionality to system administrators. In some embodiments, the system administrator is no longer constrained by the use of an external console to configure the USB assignment. Moreover, embodiments of the system are rendered safer because there is no longer a need to run any IPL to save a configuration. Finally, in some embodiments the operating is fully transparent for the blade center users.

While an embodiment of the invention is particularly shown and described, various changes in form and detail may be made therein without departing from the spirit, and scope of the invention.

What is claimed is:

1. A computer implemented method comprising:
   automatically storing a copy of data contained on a peripheral device in each memory area in response to a detection that the peripheral device is in communication with the memory device, wherein the memory device is partitioned into at least 'n' memory areas;
   assigning one of the at least 'n' memory areas to each of a plurality 'n' of servers;
   establishing communication between the plurality of servers and the plurality of assigned memory areas via a switch controller, wherein the switch controller is configured to access the plurality of assigned memory areas via a processor.

2. The computer implemented method of claim 1, further comprising copying the data from the peripheral device into the plurality of at least 'n' memory areas.

3. The computer implemented method of claim 1, further comprising allowing the plurality of server to simultaneously access the plurality of assigned memory areas.

4. A system comprising:
   a memory device partitioned into at least 'n' memory areas, wherein the memory device is configured to:
      automatically store a copy of data contained on a peripheral device in each memory area in response to a detection that the peripheral device is in communication with the memory device;
   a processor coupled to the memory device for assigning one of the at least 'n' memory areas to each of a plurality 'n' of servers; and
   a switch controller coupled to the processor and to the plurality of servers for establishing communication between the plurality of servers and the plurality of assigned memory areas.

5. The system of claim 4 further comprising a port interface for copying the data from the peripheral device into the plurality of at least 'n' memory areas.

6. The system of claim 4 further comprising a plurality of communication buses to couple each of the plurality of servers to the switch controller.

7. The system of claim 6 wherein the plurality of communication buses are USB standard compliant buses.

8. The system of claim 4 wherein the peripheral device comprises a USB compliant device.

9. The system of claim 4 further comprising a computer interface to connect a computer device.

10. The system of claim 9 wherein the computer interface comprises serial port compliant interface.

11. The system of claim 4 wherein the at least 'n' memory areas are contiguous.

12. The system of claim 4 wherein the access of the plurality of servers to the plurality of assigned memory areas is a simultaneous access.

13. The system of claim 4 wherein the plurality of servers are blade servers mounted on a single chassis.

14. A blade center comprising:
   a plurality of blade servers mounted within a chassis; and
   a management module coupled to the plurality of server blades, wherein the management module comprises:
      a memory device partitioned into at least 'n' memory areas, wherein the memory device is configured to:
         automatically store a copy of data contained on a peripheral device in each memory area in response to a detection that the peripheral device is in communication with the memory device;
      a processor coupled to the memory device for assigning one of the at least 'n' memory areas to each of a plurality of servers;

a switch controller coupled to the processor and to the plurality of servers for establishing communication between the plurality of servers and the plurality of assigned memory areas.

15. The blade system of claim 14 wherein the management module further comprises a port interface for copying the data from the peripheral device into the plurality of memory areas on the memory device.

16. The blade system of claim 14 wherein the management module further comprises a computer interface to connect a computer device.

17. The blade system of claim 14 wherein the switch controller is further configured to facilitate simultaneous communications between the switch controller and the plurality of blade servers.

18. A computer program product comprising:
- a computer readable storage device to store a computer readable program, wherein the computer readable program, when executed by a processor within a computer, causes the computer to perform operations comprising:
  - automatically storing a copy of data contained on a peripheral device in each memory area in response to a detection that the peripheral device is in communication with the memory device, wherein the memory device is partitioned into at least 'n' memory areas;
  - assigning one of the at least 'n' memory areas to each of a plurality 'n' of servers;
  - establishing communication between the plurality of servers and the plurality of assigned memory areas via a switch controller, wherein the switch controller is configured to access the plurality of assigned memory areas via a processor.

19. The computer program product of claim 18, wherein execution of the computer executable instructions cause the computer to perform further operations comprising copying the data from the peripheral device into the plurality of at least 'n' memory areas.

20. The computer program product of claim 18, wherein execution of the computer executable instructions cause the computer to perform further operations comprising allowing the plurality of server to simultaneously access the plurality of assigned memory areas.

* * * * *